United States Patent [19]
Yamada et al.

[11] Patent Number: 5,600,215
[45] Date of Patent: Feb. 4, 1997

[54] CONTROLLER FOR ELECTRIC VEHICLE

[75] Inventors: Hiroyuki Yamada; Shotaro Naito, both of Hitachinaka; Sanshiro Obara, Ibaraki, all of Japan

[73] Assignees: Hitachi, Ltd.; Hitachi Automotive Engineering Co., Ltd., both of Japan

[21] Appl. No.: 499,135

[22] Filed: Jul. 7, 1995

[30] Foreign Application Priority Data

Jul. 7, 1994 [JP] Japan .................................. 6-156162

[51] Int. Cl.$^6$ ..................................... H02P 7/29
[52] U.S. Cl. ........................... 318/139; 318/432; 318/434
[58] Field of Search ................................... 318/139, 432, 318/434; 180/65.1–65.8

[56] References Cited

U.S. PATENT DOCUMENTS

| | | | |
|---|---|---|---|
| 4,590,413 | 5/1986 | Gritter et al. | 318/803 |
| 5,193,067 | 3/1993 | Sato et al. | 364/483 |
| 5,265,022 | 11/1993 | Chonan et al. | 364/431.04 |
| 5,281,900 | 1/1994 | Park | 318/139 |
| 5,343,137 | 8/1994 | Kitaoka et al. | 307/10.7 |
| 5,384,522 | 1/1995 | Toriyama et al. | 318/371 |
| 5,412,323 | 5/1995 | Kato et al. | 324/429 |

FOREIGN PATENT DOCUMENTS 4-183206  6/1992  Japan.

Primary Examiner—David S. Martin
Attorney, Agent, or Firm—Evenson, McKeown, Edwards & Lenahan P.L.L.C.

[57] ABSTRACT

The invention provides an electric vehicle controller in which the generated motor torque is limited when the voltage of the vehicle battery decreases during running, in order to suppress over-discharge of the battery. A high torque can be obtained for a short period, however, even in the torque limiting period, and over-discharge is prevented by stopping electric power converting means in a final stage of discharge voltage of the battery. According to the invention, during operation of the vehicle, the battery terminal voltage is monitored and compared with a first comparison value $V_1$. If the battery voltage falls below $V_1$, a first counter commences measurement of the time period during which this condition continues. If the time period measured by the first counter reaches a preset value $t_1$, torque limitation is initiated. In the torque limitation state, a torque command signal, generated by the control to operate the vehicle motor, is compared with the signal generated by the vehicle accelerator, and the signal having the lower value is thereafter used to control operation of the vehicle motor. In order to provide the capability to generate higher levels of torque for brief periods during torque limitation, the torque limitation process is terminated if the accelerator pedal is released completely.

10 Claims, 7 Drawing Sheets

CONSTRUCTION OF CONTROLLER FOR ELECTRIC VEHICLE

FIG. 1 CONSTRUCTION OF CONTROLLER FOR ELECTRIC VEHICLE

CONTROLLER FOR ELECTRIC VEHICLE

BACKGROUND OF THE INVENTION

1. Field of the Invention

The present invention relates to a controller for a battery powered electric vehicle, and more particularly to a controller suitable for an electric car.

2. Description of the Related Art

For a vehicle using a battery (secondary battery) such as an electric car, it is possible for the vehicle to become incapable of running owing to exhausting of charge of the battery during driving.

Therefore, in the past, in order to prevent inoperability of the vehicle, the remaining amount of electric power in its battery is monitored to suppress the amount of electric power consumed when the discharge progresses to a certain amount. A technology is proposed in, for example, Laid-Open No.4-183206 (1992), Japanese Patent Application where a small capacity motor, separate from the main motor, is provided to drive an electric vehicle, and the drive motor is switched from the main motor to the small capacity motor to continue running when the voltage of the battery decreases owing to the progress of discharge.

The technology described above has the following disadvantages due to an increase in the weight of the vehicle, increase in the complexity of the construction, adverse influence owing to over-discharge of the battery, and a change in driving feeling of the vehicle, which are not taken into account.

Firstly, in the conventional technology, the electric vehicle required to mount a large capacity battery by its nature has to additionally mount another motor. Therefore, the conventional technology is opposed to the main design criterion of an electric vehicle that it be as light as possible to lengthen the running distance with a single battery charge, by effectively utilizing the limited capacity of the battery.

Secondly, in order to assure safety in a vehicle of such a type, for example in exiting a railroad crossing or the like, the vehicle must have capability of driving with a large torque for a short time, even if the battery is exhausted in a carotene degree during running on an ordinary road. In the conventional technology, it is difficult to maintain safety because the drive system is switched to a motor driving with a small torque, and the vehicle cannot cope with the situation. Thirdly, in the conventional technology, the switching of motors for driving the vehicle causes a noticeable change in handling characteristics of the vehicle, which can be unpleasant to the driver. The handling of the vehicle is deteriorated, since the running performance decreases in a step-down shape after the switching of the motors.

Fourthly, in the conventional technology, when the voltage of the battery decreases below a certain value, an electric power converting means for controlling electric power cannot output a desired power in some cases. When the vehicle continues to be driven using the small capacity motor in these instances, the battery is over-discharged, which deteriorates its performance and shortens its life.

SUMMARY OF THE INVENTION

The object of the present invention is to provided a controller for an electric vehicle which, when the remaining amount of electric power of the battery decreases, can limit electric power consumption by the vehicle motor without giving an unpleasant feeling to the driver, can drive the vehicle with a large torque for a short time, can obtain a sufficient running distance with a single battery charge, and can prevent the over-discharge of the battery.

According to a first embodiment of the present invention, the object described above can be attained by providing a controller which comprises a voltage detecting means for monitoring the terminal voltage of the battery and determining whether the terminal voltage is lower than a preset first comparison voltage; time detecting means for measuring the time elapsed from the point when the battery terminal voltage falls below the first present voltage, and for determining whether the elapsed time exceeds a first preset time period; and calculating means for producing a torque limiting command signal which decreases to a set lower limit at a given decreasing rate starting at the time when the battery terminal voltage falls below the first comparison value. The torque of the motor for driving the vehicle is controlled using either the torque command signal produced by operation of the accelerator pedal or the torque limiting command signal, whichever has the smaller value.

Further, according to a second feature of the invention, after generation of the torque limiting command signal, operation of electric power converting means for supplying electric power to the motor for driving the vehicle is stopped when elapsed time after the terminal voltage of the battery falls below a preset second comparison voltage exceeds a second preset time period.

Furthermore, according to a third feature of the present invention, the torque limiting command signal is cancelled when the operating amount of the accelerator operation inputting means becomes zero.

The voltage of the battery detected with the voltage detecting means is compared with an arbitrary preset comparison voltage. If the voltage of the battery is lower than the preset comparison voltage, the duration of this state is measured. If it continues for an arbitrary first preset time period, it is concluded that the remaining battery charge is small, and the torque of the motor is gradually decreased at a rate based on the torque limiting command signal.

As the result, the torque of the motor is decreased and the electric power demand on the battery is decreased. Therefore, the voltage of the battery is not rapidly decreased, and hence the vehicle can continue running.

As the battery is further discharged, the battery becomes over-discharged even if the vehicle is driven with decreased motor torque. In order to prevent such over-discharging, the voltage of the battery is further compared with a second comparison voltage. If the voltage of the battery remains below the second comparison voltage for the second preset time period or more during the torque limiting state of the motor, operation of the electric power converting means for supplying electric power to the motor is stopped to prevent over-discharging of the battery.

When the vehicle is required to be accelerated or run faster due to some change in the running condition while the motor is being driven under a state of limited torque with the voltage of the battery being near the limit value, the motor torque limitation is released by stepping off the accelerator once. Although the voltage of the battery decreases by depressing the accelerator again, it takes a certain time to detect this state. Therefore, the vehicle can be accelerated or driven with a high load if necessary since it is possible to generate a motor torque required for the acceleration within the time period.

After a certain time elapses, operation for limiting the torque of the motor is performed as described above to suppress to decrease the voltage of the battery.

DETAILED DESCRIPTION OF THE INVENTION

A controller for an electric vehicle according to the present invention will be described in detail below, referring to an embodiment shown in the accompanying drawings.

Figure 1:
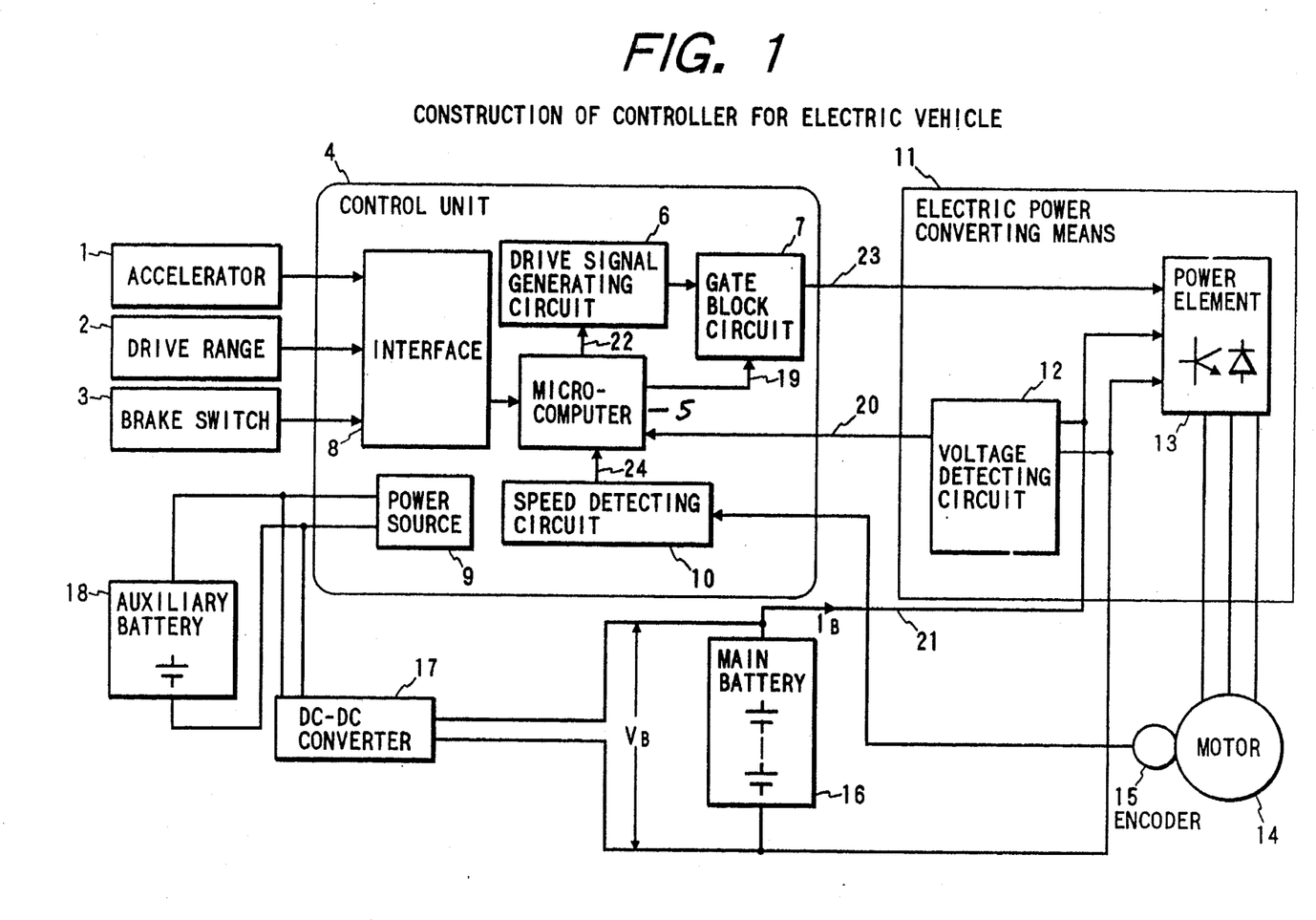
FIG. 1 is a block diagram showing the construction of an embodiment of a controller for an electric vehicle in accordance with the present invention.

FIG. 1 shows an embodiment where the present invention is applied to an electric vehicle comprising an electric power converting means having an inverter to control an induction motor for driving the vehicle.

In FIG. 1, the main battery 16 (secondary battery) has a rated capacity corresponding to the performance required for the vehicle. The battery terminals are connected to input terminals of an electric power converting means 11, which converts direct current electric power into three-phase alternating electric power necessary for driving an induction motor 14 for driving the vehicle. The electric power converting means has semiconductor power elements 13 composing an inverter, and a voltage detecting circuit 12 which detects the terminal voltage of the main battery 16 and transmits a detected voltage signal 20 to a control means 4.

The control means 4 incorporates a micro-computer 5, a speed detecting circuit 10, a drive signal generating circuit 6, a gate block circuit 7, an interface circuit 8, and an electric power source circuit 9.

An encoder 15 for speed detecting is provided in the motor 14, and the speed detecting circuit 10 receives the signal from the encoder 15 and transmits it to the micro-computer 5 as a detected speed signal 24.

The drive signal generating circuit 6 generates a drive signal 23 which drives the semiconductor power elements 13 in the electric power converting means 11 in response to a driving command signal 22 calculated by the micro-computer 5 based on a signal from the interface circuit 8 and the detected speed signal 24 received from the speed detecting circuit 10.

The gate block circuit 7 is controlled by a gate block signal 19 output from the micro-computer 5 to selectively interrupt transmission of the drive signal 23 to the electric power converting means 11. The drive signal is transmitted when the gate block signal 19 is in a high level, and the drive signal is interrupted when the gate block signal is in a low level.

The interface circuit 8 performs input processing for external signals such from an accelerator (an accelerator operation inputting means) 1, a drive range switch 2, and a brake switch 3, and transmits them to the micro-computer 5.

The accelerator 1 has a foot operated accelerator pedal of the type commonly used in cars, which generates an accelerator operation signal corresponding to the degree of depression of the accelerator, and an acceleration-off signal 49 when the pedal is returned to a resetting position.

The drive range switch 2 is operated when selection is performed on forward running, or backward running and inputs a switching signal required for determining the rotating direction of the motor 14 to the control means 4. The brake switch 3 inputs a signal required for generating a braking torque of the motor 14 to a braking means 4 when the brake pedal is depressed.

The electric power source circuit 9 produces an electric power having a voltage necessary for operating the control means 4 from the direct current electric power supplied from an auxiliary battery 18 separately provided from the main battery 16.

The auxiliary battery 18 is for back-up, and is charged with the main battery 16 through a DC—DC converter 17.

Control operation with the control means 4 mainly composed of the micro-computer 5 will be described below, referring to the control block diagram of FIG. 2.

Initially, an accelerator operation signal from the accelerator 1 is input to a torque function generating block 25. At the same time, a detected motor speed signal 26 is also input to the torque function generating block 25. Therein a torque command signal 27 expressing a driving torque generated by the motor 14 is calculated based on the two kinds of the data. The calculated torque command signal 27 is then input to a limiting processing block 28, to limit the torque if necessary, according to a limiting process explained hereinafter.

The processed torque command signal 27' is input to a speed control block 29 and an exciting current function generation block 33. At the same time, the detected motor speed signal 26 is also input to the speed control block 29.

A speed difference signal 30, calculated and output by the speed control block 29, is input to a torque current calculation block 31, and a command signal of torque current 32 used for vector control is output from the torque current calculation block.

On the other hand, in the exciting current function generation block 33, a command signal of magnetic flux current 34 corresponding to the torque command signal 27' is calculated and output. The command signal of magnetic flux current 34 is input to a magnetic flux controlling and calculating block 35, which performs magnetic flux response control to output exciting current command signal 36 which is input to a vector calculation block 53.

The calculated command signals of torque current 32 and exciting current 36, together with the detected motor speed signal 26 are input to a slip frequency calculation block 37 to calculate a slip frequency command signal 52 which is input to a vector calculation block 53.

The vector calculation block 53 generates signals required for controlling the electric power converting means 11 (FIG. 1) based on the torque current command signal 32, the exciting current command signal 36 and the slip frequency command signal 52.

The detected motor speed signal 26 is calculated in and output by a motor speed calculation block 38 based on a motor speed signal (motor encoder pulses) 39. The motor speed signal 39 externally input is identical with the signal 24 in FIG. 1.

A detected voltage signal 42 is output from a voltage detecting block 41, based on the detected voltage signal (voltage signal) 40 externally input. The detected voltage signal 40 is identical with the signal 20 in FIG. 1.

The detected voltage signal 42 is input to a voltage comparator 43 to be compared with a preset threshold voltage (the first comparison voltage).

If the threshold voltage is higher than the detected voltage signal 42, a first limiting judgment flag 44 and a second limiting judgment flag 45 are output (at a high level).

The first limiting judgement flag 44 is input to a first timer processing block 47 (detecting timer 1), which counts the time while the first limiting judgement flag 44 remains at the high level. When the counted time exceeds a first preset time period, a torque limiting command signal 46 is generated and transmitted to the limiting processing block 28, where it. The smaller of these two signals is employed as the command signal for operation, to output it as the torque command signal 27'.

The second timer processing block 48 (detecting timer 2) receives the signals of the second limiting judgment flag 45, and counts the time while the second limiting judgment flag 45 remains at the high level. When the counted time exceeds a second preset time period, a gate block signal 19 is generated and transmitted to the gate block circuit 7 (shown in FIG. 1) to stop control of the electric power converting means 11.

Figure 2:
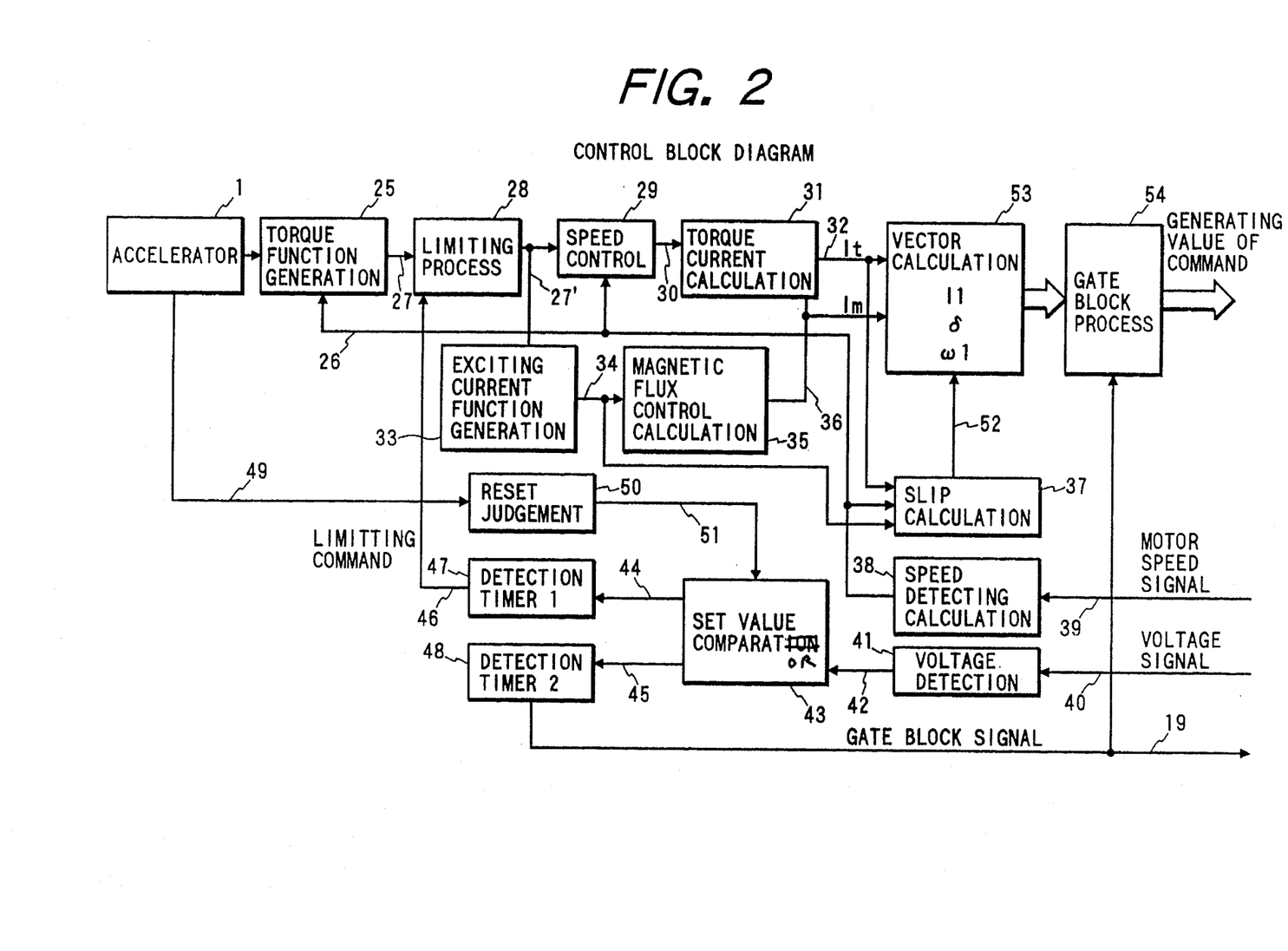
FIG. 2 is a control block diagram of an embodiment in accordance with the present invention.

Referring to FIG. 2, in order to interrupt the output of the driving command signal from the vector calculation block 53 even in a software-form, the gate block signal 19 is supplied to the gate block processing block 54 to cut off the transmission of the command signal.

Description will be made below of the process in FIG. 2 from the voltage comparing processing block 43 to the first timer processing 47 where the torque limiting command signal 46 is produced, referring to FIG. 3.

In step 301, the voltage $V_B$ of the main battery is detected based on the detected voltage signal 40.

Next, in step 302, an accelerator reset flag is checked, and if it is in a state equivalent to a release of the accelerator (that is, in the low level), processing proceeds to step 303 to reset the first limiting flag, and to step 304 to reset the torque limiting command signal to a maximum value. Thereafter, in step 305 the timer counter 1 for detecting time is cleared to complete the processing.

On the other hand, if the accelerator reset flag is in a state indicative of depression of the accelerator (in the high level), processing proceeds to step 306 to check the first limiting flag. (If the first limiting flag has been set, a limiting operation is being performed).

Where the first limiting flag is cleared, processing proceeds to step 307 to compare the detected voltage value $V_B$ with the first comparison voltage $V_1$.

If $V_B$ is larger than the first comparison voltage $V_1$, processing proceeds to step 303, and the limiting operation is released, since it is concluded that the terminal voltage of the main battery 16 is not so lowered even with the accelerator depressed. On the other hand, if the detected voltage value $V_B$ is smaller than the first comparison voltage $V_1$, it is concluded that the terminal voltage of the main battery 16 is lowered when the accelerator is depressed, and processing proceeds to step 308 to add 1 (one) to the timer counter 1 to detect the time during which the voltage is kept low. Next, in step 309, the value in the timer counter 1 is checked, and if it is larger than $C_1$, the first limiting flag is set in step 310 and the limiting operation mode is commenced in step 311, since the time during which the terminal voltage is kept low exceeds the first preset time period $t_1$.

On the other hand, if it is determined in step 309 that the value in the timer counter 1 is smaller than $C_1$, processing proceeds to step 311 to calculate a torque limiting command signal for limiting the torque of the motor (without setting the first limiting flag), since the time during which the terminal voltage has remained low does not exceed the first preset time period $t_1$.

In step 312 it is determined whether the calculated torque limiting command signal is smaller than a lower limit value $x_1$. If so, the process proceeds to step 313 to set the torque limiting command signal to the lower limit value $x_1$ in order to prevent the value from decreasing to an unnecessary extent.

The calculation of the torque limiting command signal in step 311 may be performed by simply subtracting 1 (one) from the maximum value for the torque limiting command signal, or by providing a predetermined pattern and decreasing the torque limiting command signal according to the pattern.

The lower limit $x_1$ for the torque limiting command signal may be a simple set value, or may be decreased depending on the number of past limiting operations which have been implemented.

The flow of the limiting process in FIG. 3 will be described below, referring to the time chart of FIG. 4, in which the accelerator is depressed at time $T_0$ as shown by line (a). Thereafter, a torque command signal for torque is generated as shown by line (d). When the opening of the accelerator becomes 100%, the command signal for torque also becomes 100%.

In a case where the main battery 16 has been discharged to a great extent, the detected voltage signal $V_B$ decreases as shown by line (b). (Line (c) in FIG. 4 expresses the current $I_B$ Of the battery 16.) At time $T_1$, $V_B$ becomes lower than the first comparison voltage value $V_1$, and the timer counter 1 starts to count time. During this period the torque continues to be generated at 100% as shown by the line (d).

When the count value in the timer counter 1 reaches $C_1$ at time $T_2$ (that is, the time during which the voltage is below $V_1$ exceeds the first preset time period $t_1$), the first limiting flag is set as shown by line (e) at the time $T_2$ and reduction of the torque limiting command signal commences as shown by line (f). That is, after the time $T_2$, the torque limiting command signal is shifted to a decreasing state, and decreases smoothly with a given ratio as shown by the line (f).

The command signal which is actually used to control the motor is determined by selecting the smaller value as between the torque command signal given by the opening of the accelerator and the torque limiting command signal given by the calculation of the limiting process. Therefore, in the result, the torque command signal becomes smaller than the command signal given by the opening of the accelerator, as shown by the line (d). Then, after a certain period has elapsed, the torque limiting command signal is set to a constant minimum value (min value) at time $T_3$ as shown by the line (f), and hence the torque command signal also becomes a constant.

Therefore, according to this embodiment, the discharging current $I_B$ is limited depending on the discharge state of the main battery 16, independently of the opening of the accelerator at that time. As a result, the voltage again increases, and the discharge rate of the main battery 16 is moderated. Accordingly, the vehicle can continue to run, while effectively utilizing the capacity of the battery to extend the running distance, though the running torque is low under such a condition.

Since the torque command signal at time $T_2$ is not changed abruptly (in a step-shape) but decreases gradually, an unexpected change in the torque accordingly does not occur and the driving feeling (vehicle handling) is not deteriorated.

Further, since a high torque can be attained within a short period even in the time duration $t_1$ after the voltage of the battery is decreased below the judging voltage $V_1$, the vehicle can cope with an emergency operation such as exiting a railroad crossing within the time duration to attain sufficient safety.

In other words, according to the present invention, when the accelerator is depressed farther under a condition where the remaining charge of the battery is decreased and the voltage is lowered, decrease in the voltage is detected to limit the magnitude of torque. Therefore, even if the accelerator is depressed farther in order to increase the output power of the motor under the condition of small remaining charge in the battery, the torque command signal is limited against the opening of the accelerator to suppress the voltage drop of the battery. Since the vehicle continues to be driven in a low torque state (and accordingly with a low produced torque itself even if the accelerator is depressed farther), the capacity of the battery can be fully utilized without decreasing its voltage.

After the limiting operation has been repeated several times, the remaining charge in the battery performing plural times of the limiting operation] is, of course, less than that at the first time of the limiting operation. In this embodiment, the limiting operation may be adapted to the remaining charge of the battery, since the lower limit for the torque limiting command signal may be further reduced relative to the lowered limit in the past.

Figure 5:
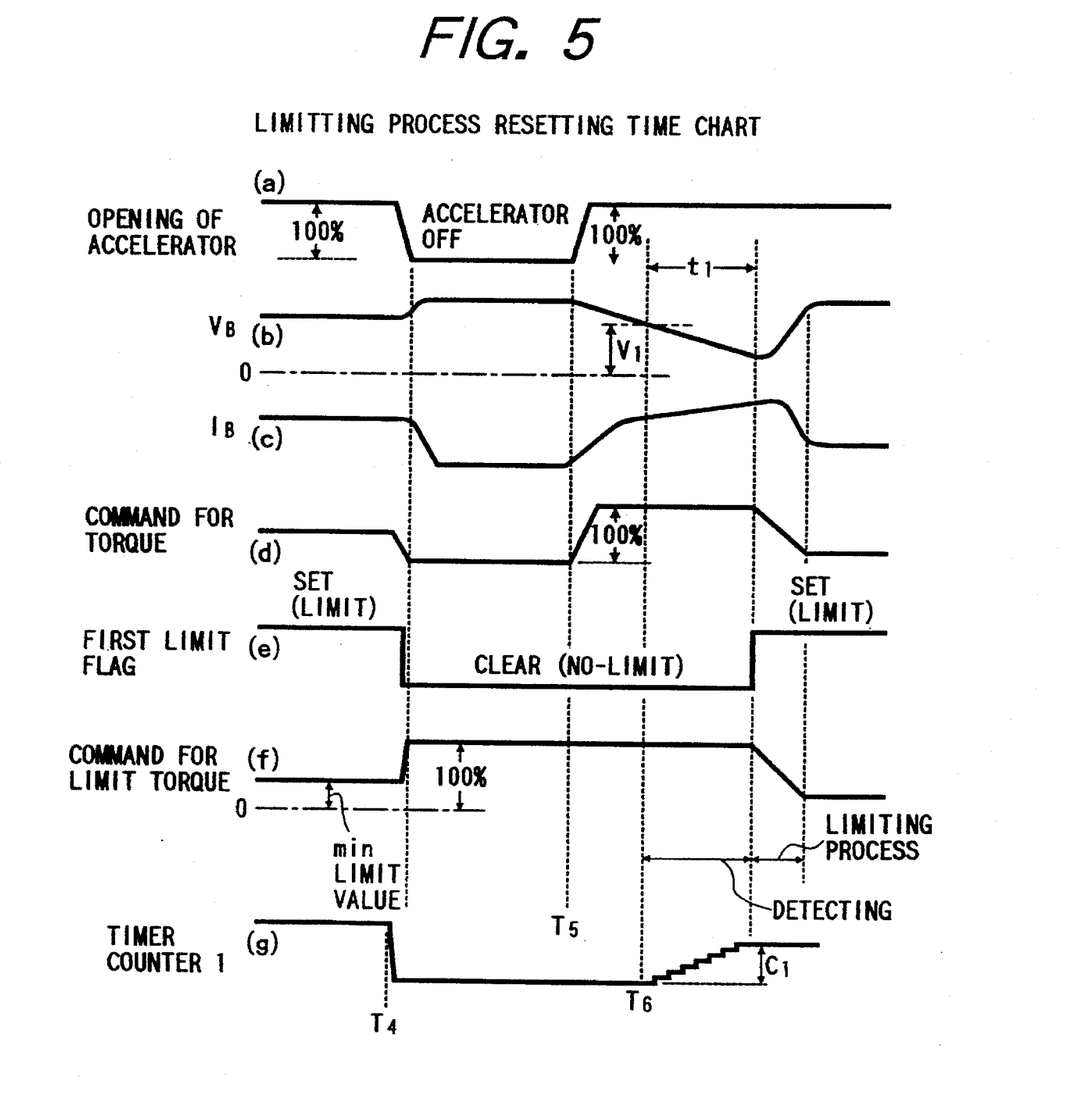
FIG. 5 is a time chart explaining the resetting operation of torque limiting process in an embodiment in accordance with the present invention.

FIG. 5 is a time chart showing the operation of resetting the limiting process (that is, exiting from a limiting processing state) by an acceleration-off. The acceleration-off means a state where the depression of an accelerator pedal is nearly zero, that is, a state where the accelerator pedal is in the returned or unactuated position.

In this embodiment, as in that described above, when the accelerator pedal is depressed an accelerator opening signal is output from the accelerator 1 in FIG. 1 to input to the torque function generating block 25, and an acceleration-off signal 49 is output from the accelerator 1 when the accelerator pedal is in the returned position. The acceleration-off signal 49 is input to the reset judging block 50, to reset the accelerator resetting flag 51 when the acceleration-off signal 49 is output.

Figure 3:
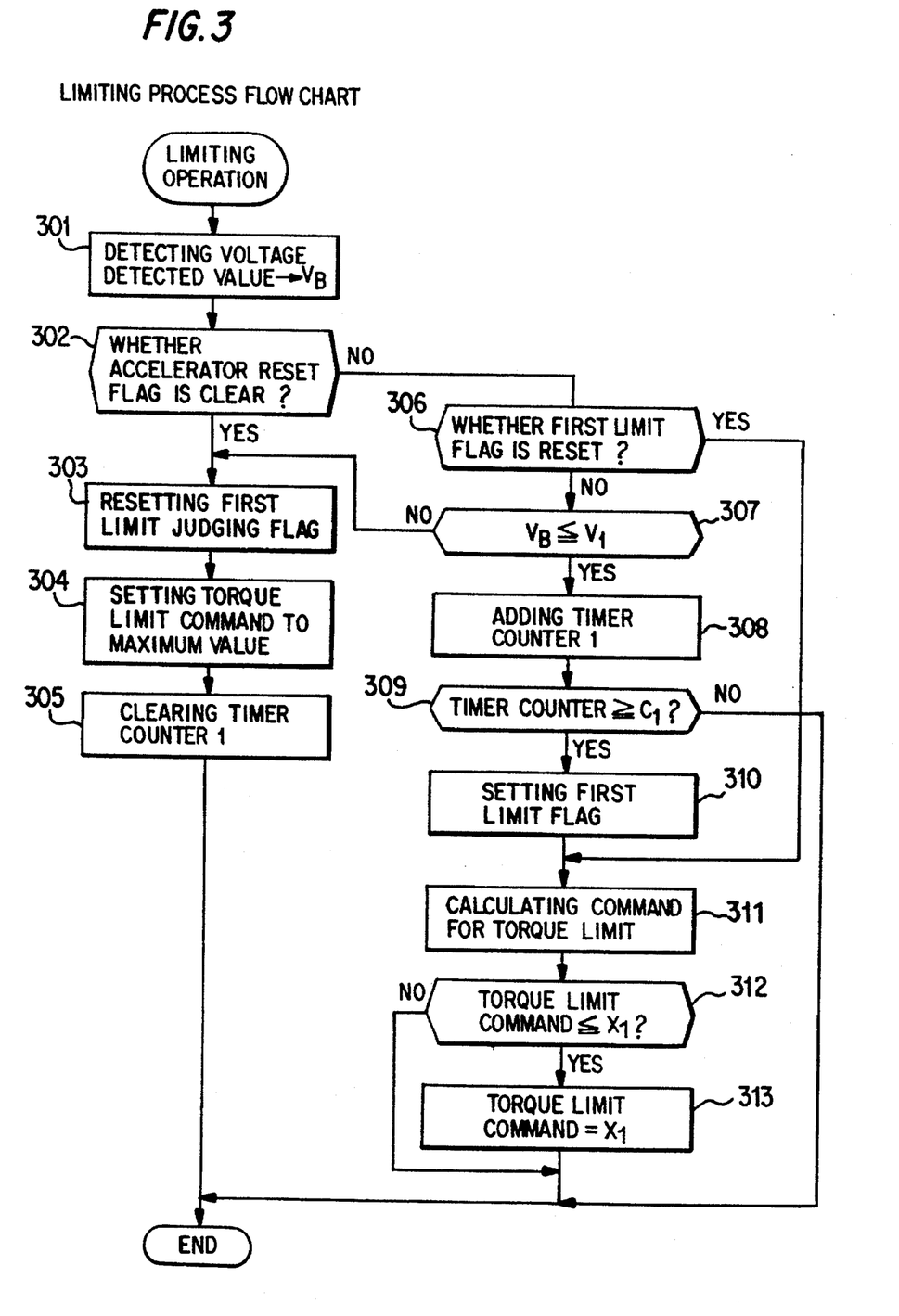
FIG. 3 is a flow chart explaining the operation of torque limiting process in an embodiment in accordance with the present invention.
Figure 4:
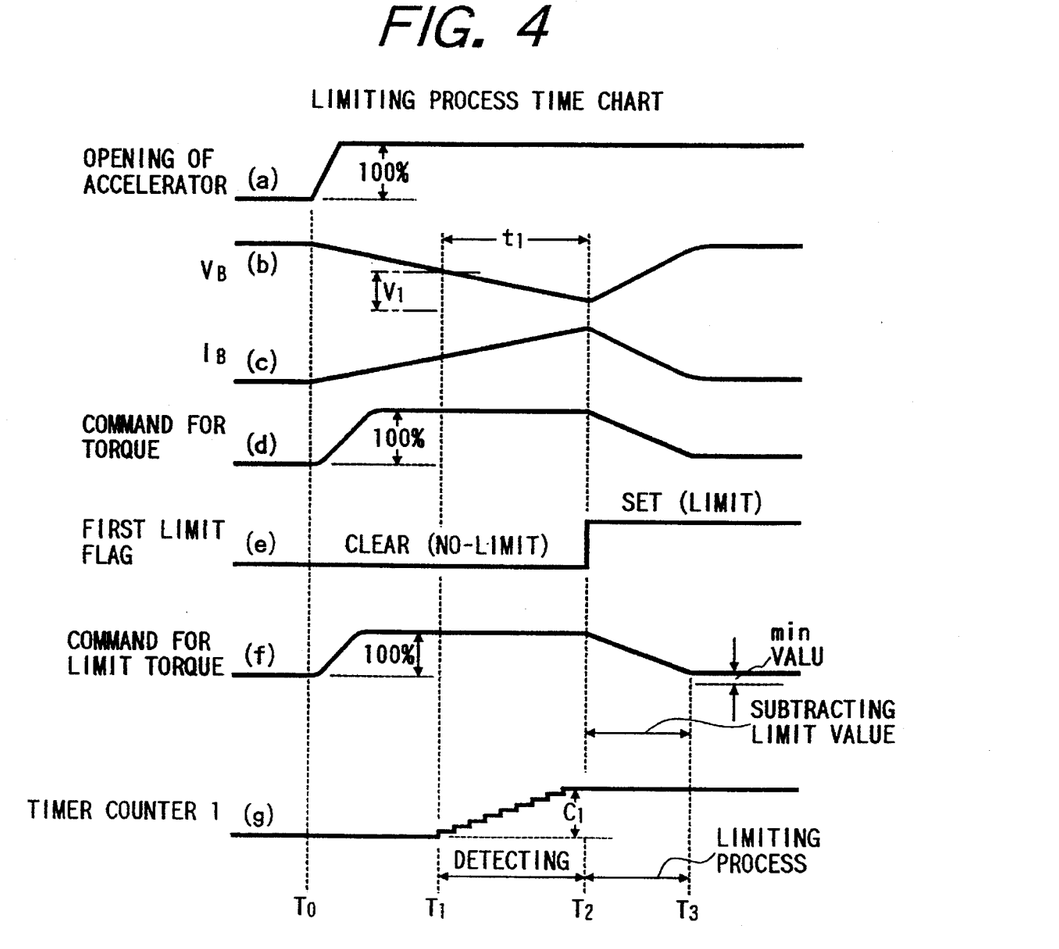
FIG. 4 is a time chart explaining the operation of torque limiting operation in an embodiment in accordance with the present invention.

Therefore, when the processing in FIG. 3 is performed while the acceleration-off signal is output, the process proceeds from step 302 to step 303. In this case, after resetting the first limit judging flag, the torque limiting command signal is set to the maximum value in step 304 as described above. Thus, when the processing is in a limiting state, resetting of the limiting process is performed by an acceleration-off as shown in FIG. 5.

In FIG. 5, the acceleration-off takes place at time $T_4$ when a limiting process is being implemented, after the time $T_3$ in FIG.

In the limiting process state, before the time $T_4$, the torque limiting command signal is decreased to the minimum limit value as shown by line (f) of FIG. 5. Therefore, the torque command signal is lower than 100% owing to the torque limiting command signal as shown by line (d) even if the opening of the accelerator is 100%.

When the acceleration-off takes place at the time $T_4$, the limiting process is discontinued, the first limit flag is cleared, and the torque limiting command signal is reset to 100% as described above.

Thereafter, when the accelerator pedal is again depressed at, for instance, time $T_5$, the torque command signal is arbitrarily controlled to correspond to the opening of the accelerator as shown by the line (d) since the torque limiting command signal is set to 100%. The command signal may become 100%.

If the remaining charge of the battery at this point is small, the detected voltage value $V_B$ decreases as shown by line (b), and if the detected voltage value falls below a threshold of the first comparison voltage $V_1$ at time $T_6$, the controlling state is once again shifted to the limiting process.

By decreasing the magnitude of the torque limiting command signal, the voltage $V_B$ is recovered to continue operation.

Therefore, according to this embodiment, even if the control once enters in the limiting operation due to a decrease in the battery voltage, and the torque command signal cannot be increased by stepping the accelerator deeper, maximum torque can be produced for a time duration of at least $t_1$ by returning the accelerator pedal once to its unactuated position. As a result, even when the remaining charge of the battery is decreased, large torque can be obtained for a short period of time, to accelerate the vehicle by repeatedly stepping on and off the accelerator pedal.

Further, according to the invention, by increasing the time for the subtracting calculation of the torque limiting command signal in the limiting process, a driver can drive the vehicle without experiencing a rapid decrease in the torque. Since a natural limiting operation can be attained as described above, a pleasant driving feeling can be realized.

It should be noted that if torque limiting is directly performed by detecting voltage change of the battery as in the conventional manner instead of employing the present invention, the following cyclic process will occur.

The torque is limited because of the voltage decrease.
→The voltage is reset because of the limiting of torque.
→The torque is increased because of the recovering of the voltage and hence the voltage decreases. →The torque is again limited because of the voltage decrease. →. . . .

Thus, there arises an oscillation in the torque. On the other hand, according to the present invention, since the torque does not increase even when the voltage is fully recovered by limiting the torque unless the accelerator pedal is returned, occurrence of such oscillation can be suppressed.

Description will be made below on the flow of processing from the voltage comparator 43 to the gate block signal 19, through the first timer process 47 explained using FIG. 2, referring to the flow chart of FIG. 6.

Figure 6:
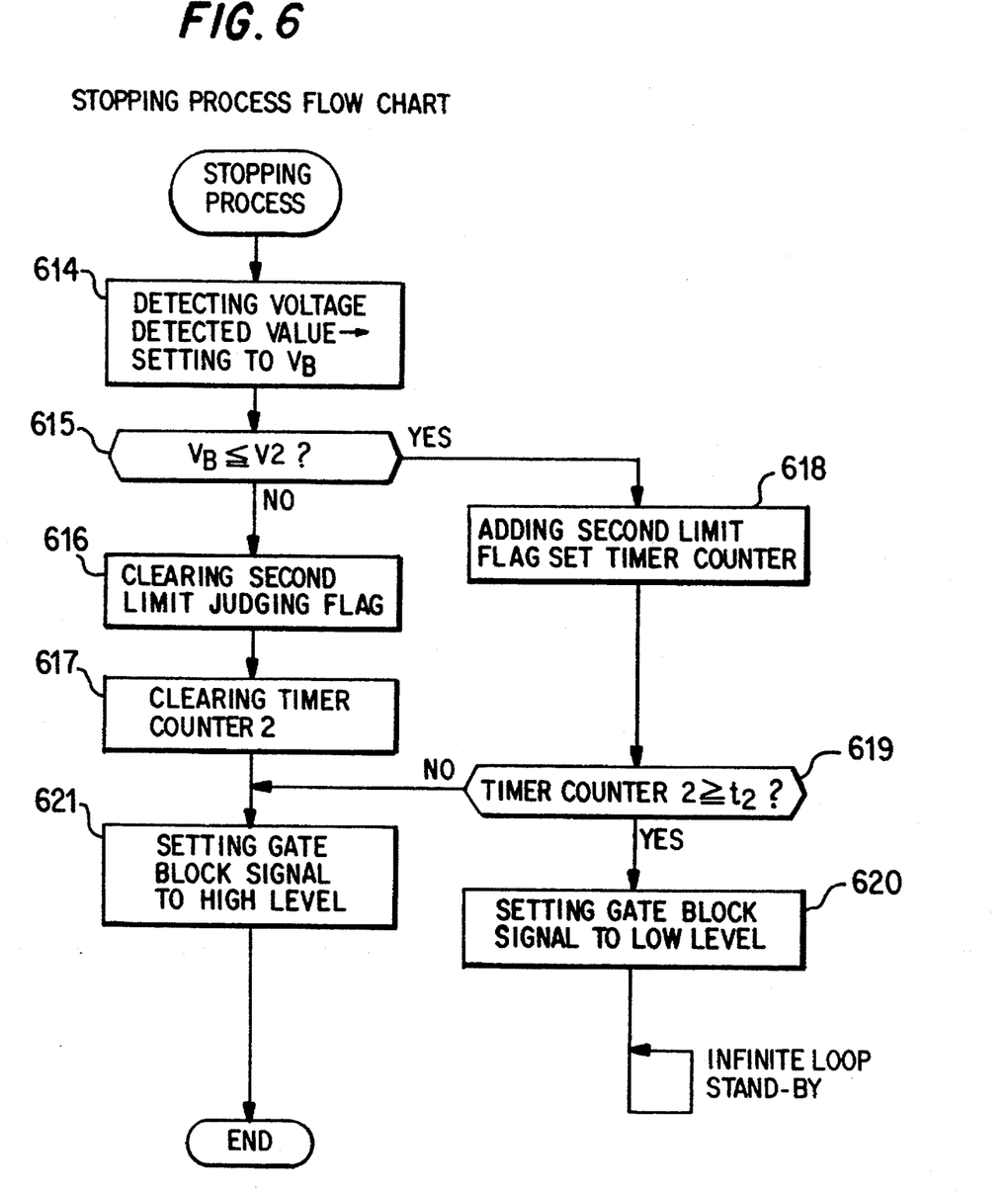
FIG. 6 is a flow chart explaining the operation of stopping process in accordance with the present invention.

As the control enters into the processing shown in FIG. 6, similar to the limiting operation of FIG. 3, the terminal voltage $V_B$ of the main battery 16 is detected and set as a variable in step 614. In step 615, the variable $V_B$ is compared with the second comparison voltage $V_2$. If $V_B$ is larger, it is concluded that the terminal voltage of the main battery 16 is not decreased, and the process proceeds to step 616, in which the second limit judging flag is cleared. The timer counter 2 for measuring elapsed time is then cleared in step 617, and in step 621 the gate block signal is set to the high level, so as to continue the operation of the electric power means 11.

On the other hand, if it is determined that $V_B \leq V_2$ in step 615, it is concluded that the terminal voltage of the main battery 16 is decreased, and the process proceeds to step 618 to add count 1 to the timer counter 2 in order to measure the duration of the voltage drop. The counting value $C_2$ of the timer counter 2 is then compared with a preset value of the second judging time $t_2$ in step 619. If $C_2$ is larger than $t_2$ (that is, the state where the terminal voltage of the main battery 16 is below the second judging voltage $V_2$ continues for longer than the second judging time $t_2$), the process proceeds to step 620, in which the gate block signal is set to the low level in order to stop generating the command signal for driving the electric power converting means 11 and cut off generation of the command signal through software.

After step 620 is executed, the processing is brought into an infinite loop state to be interlocked so that other process cannot be performed, since the vehicle cannot continue to run any more.

Although in this embodiment the stopping of processing may be performed in connection with the limiting process operation as described above, the judgment and the process for stopping of processing may be separately performed.

As to the first comparison voltage $V_1$ for judging the voltage drop in the limiting process operation and the second comparison voltage $V_2$ for judging the voltage drop in the stopping process operation, if the relationship $V_1 < V_2$ is satisfied, then the operation can be performed in order of the limiting operation and then the stopping operation.

According to the invention, when the voltage is so lowered that normal operation is not performed even if the torque is limited through the limiting operation due to decrease in the remaining charge of the battery, operation of the electric power converting means is stopped. Therefore, over-discharge and damage of the battery can be prevented.

Figure 7:
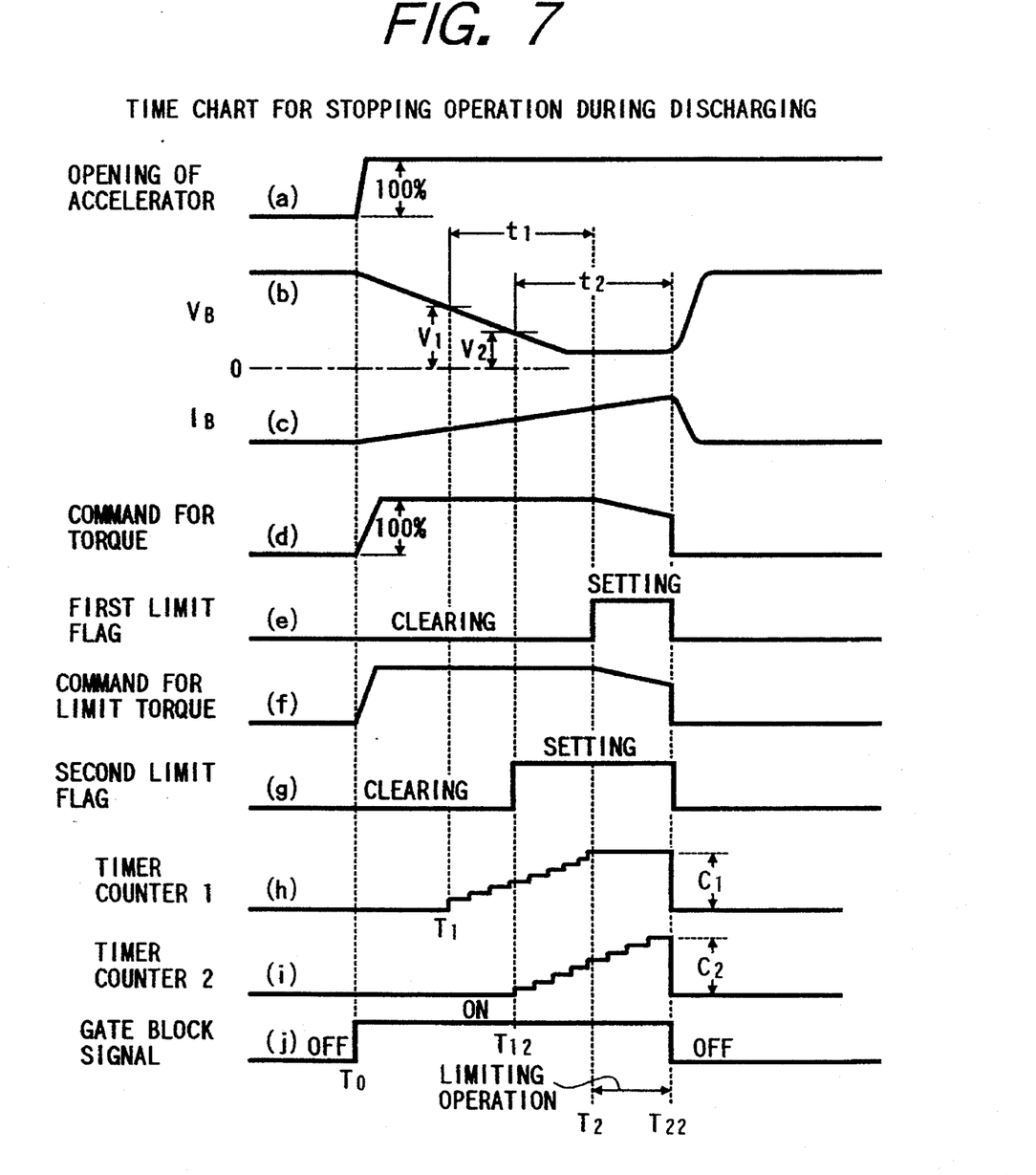
FIG. 7 is a time chart explaining the operation of stopping process in accordance with the present invention.

FIG. 7 is a time chart showing the operation stopping process. As the accelerator is depressed (changed from OFF-state to ON-state) at time $T_0$ as shown by line (a), a torque command signal is generated corresponding to the opening of the accelerator as shown by line (d). If the remaining charge of the main battery 16 is small at this point due to discharge (that is, the depth of discharge of the main battery is deep), the detected voltage $V_B$ decreases as shown by line (b). When the detected voltage $V_B$ decreases to the threshold value of the first comparison voltage $V_1$ at time $T_1$, the time counter 1 starts counting-up to measure elapsed time as shown by line (h). During this period, the torque command signal is not limited by the torque limiting command signal yet. Therefore, the torque command signal remains at 100% as shown by the line (d).

If the depth of discharge of the main battery 16 is comparatively shallow, the voltage drop stops at a certain value. If the depth of discharge of the main battery 16 is deep, however, the voltage drops further. Such a state leads to over-discharge of the battery, and affects its life-time.

Since the voltage drops further when the depth of discharge of the main battery 16 is deep (as assumed in FIG. 6), the voltage ultimately decreases to a level below the second comparison voltage $V_2$ at time $T_{12}$, as shown in line (b), and the time counter 2 starts to count as shown by line (i).

During this same period, the time counter 1 also continues counting as shown by the line (h). When the counting value $C_1$ of the time counter 1 reaches the first preset time period $t_1$ at time $T_2$, the torque limiting command signal is decreased to decrease the torque command signal in order to recover the voltage as described above. However, where the depth of discharge is deep and the remaining charge is small, the voltage does not recover after the time $T_2$ as shown by the line (b). Therefore, when the detected voltage value $V_B$ remains below the second comparison voltage $V_2$ even with the command signal of torque decreased, it is judged that the discharge will go deeper to cause over-discharge.

When this happens, the time counter 2 continues to count as shown by the line (i), and when the count reaches the value $C_2$ corresponding to the second preset time period $t_2$ at the time $T_{22}$, the gate block signal is turned off (that is, changed to the low level) to stop the operation of the electric power converting means 11.

According to this embodiment, when the depth of discharge of the main battery 16 is very deep, and the remaining charge is extremely small so that the voltage does not recover even if the command signal of torque is limited, the operation of the electric power converting means 11 is stopped. Therefore, the main battery 16 is not discharged further, and accordingly the running distance of the vehicle can be extended to the limit of the battery capacity without possibility of over-discharge.

As a result, the danger of shortening the life-time of the battery due to over-discharge can be eliminated.

According to the present invention, since the limiting of torque due to decrease in the remaining charge is performed without giving any unpleasant feeling to a driver during running of an electric vehicle, a pleasant driving feeling can be realized.

Further, according to the present invention, since a high torque can be attained for a short period even after the remaining charge of the battery is decreased and the control has entered the torque limiting state, the vehicle can certainly display a driving performance sufficient to prevent danger, and attain high safety.

Furthermore, according to the present invention, since discharge of the battery can be suppressed by limiting the torque while maintaining running capability, the capacity of the battery can be effectively utilized. Thereby, the running distance with a single battery charge can be substantially extended and over-discharge of the battery can be prevented. Thus, the service time of the battery can be extended and the running cost of the vehicle can be lessened.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A controller for a battery powered electric vehicle of the type in which a torque command signal corresponding to an extent of actuation of an accelerator input device controls a motor for driving the vehicle in response to the torque command signal, which controller comprises:

a comparator coupled to receive and compare a terminal voltage of said battery and a preset first comparison voltage;

first clock means for measuring a first elapsed time during a period when said terminal voltage is smaller than the first comparison voltage, and for detecting when the first elapsed time exceeds a first preset time period;

calculation means for producing a torque limiting command signal having a value which decreases to a set lower limit value according to a predetermined pattern, starting at the time when said first clock means detects that said first elapsed time exceeds said first preset time period;

means for comparing said torque command signal with said torque limiting command signal and for selecting the smaller thereof; and means for controlling operation of the vehicle motor in response to the selected signal.

2. Controller according to claim 1 further comprising:

a comparator coupled to receive and compare said terminal voltage of said battery with a preset second comparison voltage; and means for terminating operation of an electric power converter for supplying electric power to said motor after said terminal voltage falls below said second comparison voltage.

3. Controller according to claim 2 wherein said means for terminating operation comprises:

second clock means for measuring a second elapsed time during a period when said terminal voltage is smaller than said second comparison voltage, and for generating a blocking signal commencing when said second elapsed time exceeds said second preset time period; and means for interrupting transmission of said selected signal to control said motor when said blocking signal is being generated.

4. Controller according to claim 1 further comprising means for cancelling said torque limiting command signal when the extent of actuation of said accelerator operation inputting device becomes zero.

5. Controller according to claim 1 wherein the predetermined pattern for decreasing the torque limiting command signal is determined so as to suppress the deterioration of driving feeling of the vehicle.

6. Controller according to claim 1 wherein said lower limit value of said torque limiting command signal is sequentially up-dated in response to a number of iterations of the torque limiting command signal, counted from the time when the command signal is initially produced.

7. Method for controlling a battery powered motor vehicle having an accelerator input device, a vehicle battery, an electric motor, and an electric power converter for supplying electric power to the vehicle motor in response to a torque command signal, said method comprising the steps of:

generating a desired torque command signal in response to an extent of actuation of said accelerator input device;

comparing a terminal voltage of said vehicle battery with a preset first comparison voltage;

measuring a first elapsed time during a period when said terminal voltage is smaller than the first comparison voltage;

detecting when the first elapsed time exceeds a first preset time period;

generating a torque limiting command signal having a value which decreases to a set lower limit according to a predetermined pattern, starting when the first elapsed time signal exceeds said first preset time period;

comparing magnitude of said desired torque command signal and said torque limiting command signal;

selecting a smaller of said desired torque command signal and said torque limiting command signal; and supplying said selected smaller signal as said torque command signal to control operation of said electric power converter.

8. Method according to claim 7 further comprising the steps of:

comparing said terminal voltage of said battery with a preset second comparison value; and terminating operation of said electric power converter after said terminal voltage falls below said second comparison voltage.

9. Method according to claim 8 wherein said terminating step comprises:

measuring a second elapsed time during a period when said terminal voltage is smaller than said second comparison value;

generating a blocking signal commencing when said second elapsed time exceeds a second preset time period; and interrupting supplying of said torque command signal to said electric power converter when said blocking signal is being generated.

10. Method according to claim 7 comprising the further step of:

cancelling said torque limiting command signal when the extent of actuation of said accelerator input device becomes zero.

* * * * *